(12) United States Patent
Mine

(10) Patent No.: US 8,779,341 B2
(45) Date of Patent: Jul. 15, 2014

(54) IMAGING APPARATUS AND EXPOSURE CONTROL METHOD

(75) Inventor: Yosuke Mine, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/490,300

(22) Filed: Jun. 6, 2012

(65) Prior Publication Data

US 2012/0312960 A1 Dec. 13, 2012

(30) Foreign Application Priority Data

Jun. 9, 2011 (JP) .................................. 2011-129554

(51) Int. Cl.
*G03B 7/099* (2014.01)
(52) U.S. Cl.
USPC ............................ 250/206; 396/215; 348/294
(58) Field of Classification Search
USPC .......................... 250/208.1; 396/215; 348/296
See application file for complete search history.

(56) References Cited

U.S. PATENT DOCUMENTS

| 8,625,013 B2* | 1/2014 | Jannard et al. ................. 348/296 |
| 2009/0153710 A1* | 6/2009 | John .............................. 348/296 |
| 2011/0109754 A1* | 5/2011 | Matsunaga et al. ........ 348/208.4 |

FOREIGN PATENT DOCUMENTS

| JP | 6-130462 A | 5/1994 |
| JP | 7-110429 A | 4/1995 |
| JP | 2011-035765 A | 2/2011 |

\* cited by examiner

*Primary Examiner* — Tony Ko
(74) *Attorney, Agent, or Firm* — Canon U.S.A., Inc. IP Division

(57) ABSTRACT

A control unit sets a first control value for causing a charge accumulation unit to execute a first accumulation and obtaining first image data and a second control value for causing the charge accumulation unit to execute a second accumulation and obtaining second image data, depending on whether an operation mode set by a setting unit executes image recognition processing based on image data obtained through accumulation by the charge accumulation unit. If the operation mode set by the setting unit does not execute the image recognition processing, the control unit sets the first and second control values to be different from each other, even if an object field has a constant luminance.

12 Claims, 12 Drawing Sheets

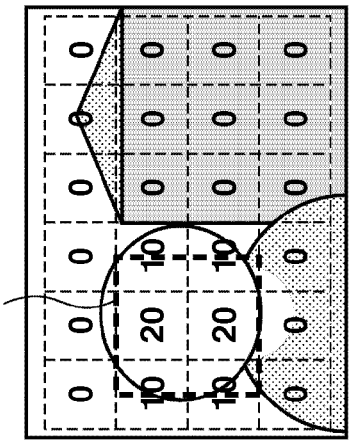
FIG.6C
WEIGHTING COEFFICIENTS BASED ON FEATURE REGION
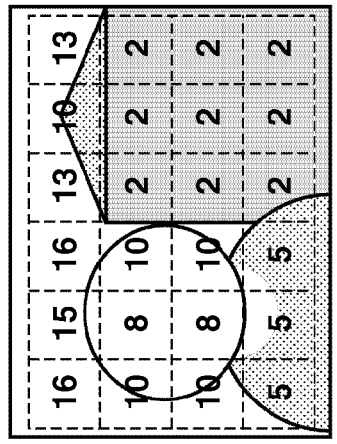
FIG.6B
LIGHT-METERING OUTPUT VALUES Y
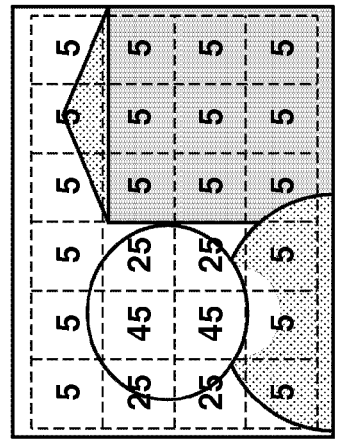
FIG.6E
WEIGHTING COEFFICIENTS k (5+(c)+(d))
FIG.6A
IMAGE DATA
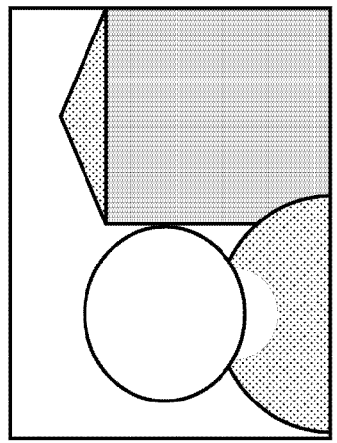
FIG.6D
WEIGHTING COEFFICIENTS BASED ON TARGET TRACKING REGION

FIG.7

| PERCENTAGE (%) OCCUPYING A LIGHT-METERING AREA | WEIGHTING COEFFICIENTS | |
|---|---|---|
| | FEATURE REGION | TARGET TRACKING REGION |
| 0~24 | 0 | 0 |
| 25~49 | 5 | 5 |
| 50~70 | 10 | 10 |
| 70~80 | 15 | 15 |
| 80~90 | 20 | 20 |
| 90~100 | 20 | 20 |

FIG.8A
OBTAINED BY IMAGE SENSOR
96 × 64 PIXELS
96 × 64 PIXELS
FIG.8B
DIVIDED INTO
LIGHT-METERING AREAS
6 × 4 AREAS ⌐200
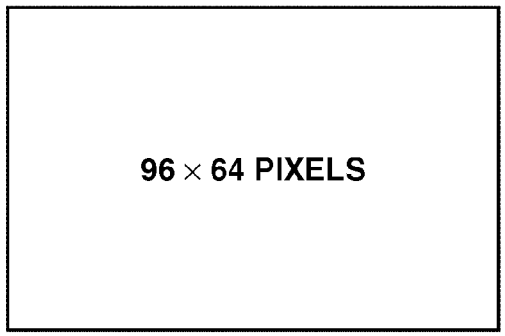
FIG.8C
ENLARGED VIEW OF
A LIGHT-METERING AREA
16 × 16 PIXELS (NO ADDITION)
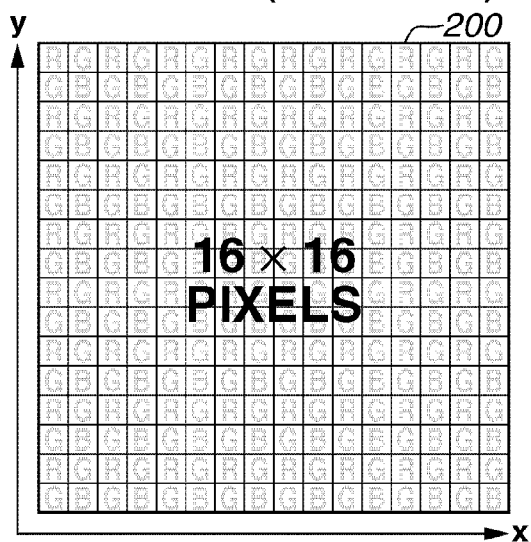
FIG.8D
ENLARGED VIEW OF
A LIGHT-METERING AREA
4 × 4 PIXELS (NUMBER OF
ADDITIONS PER COLOR FILTER: 4)
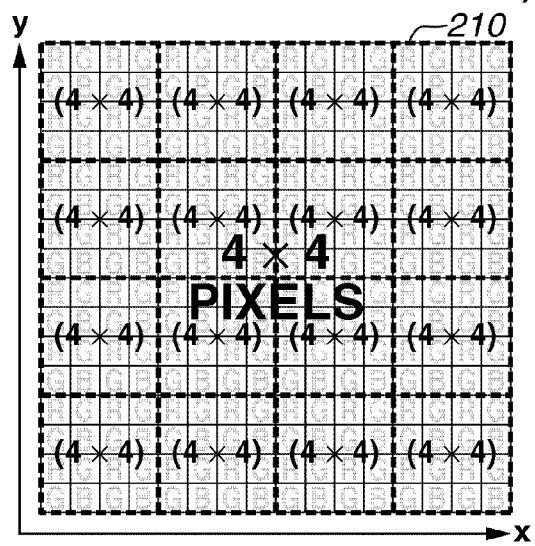

ENLARGED VIEW OF
A LIGHT-METERING AREA
2 × 2 PIXELS (NUMBER OF
ADDITIONS PER COLOR FILTER: 16)

ENLARGED VIEW OF
A LIGHT-METERING AREA
1 × 1 PIXEL (NUMBER OF
ADDITIONS PER COLOR FILTER: 64)

PROGRAM DIAGRAM (INITIAL)

PROGRAM DIAGRAM FOR P0-P1 IN D-RANGE EXPANSION PRIORITY MODE

PROGRAM DIAGRAM FOR P2 IN D-RANGE EXPANSION PRIORITY MODE

PROGRAM DIAGRAM FOR P0-P1 IN FUNCTION PRIORITY MODE

PROGRAM DIAGRAM FOR P2 IN FUNCTION PRIORITY MODE

D-RANGE EXPANSION PRIORITY MODE

FUNCTION PRIORITY MODE

IMAGING APPARATUS AND EXPOSURE CONTROL METHOD

BACKGROUND OF THE INVENTION

1. Field of the Invention

The present invention relates to an imaging apparatus and an exposure control method executing a light-metering operation by using an accumulation-type image sensor.

2. Description of the Related Art

An imaging apparatus such as a digital camera or a digital video camera generally requires a light-metering range of approximately −5 to +15, as Bv values in additive system of photographic exposure (APEX) units. Namely, such imaging apparatus has a light-metering dynamic range of approximately 20 levels. However, when an accumulation-type image sensor executes a light-metering operation, the dynamic range in a single accumulation operation is less than 20 levels.

To address this problem, there is a known technique of generating an image having a dynamic range greater than the dynamic range obtained in a single accumulation operation (imaging). Based on this technique, an identical scene is captured by an accumulation-type image sensor a plurality of times with different exposure levels, and obtained image signals are compounded. This technique is generally referred to as high dynamic range (HDR) imaging.

Similarly, various documents are proposing increasing the dynamic range of a light-metering apparatus using an accumulation-type light-sensitive element. For example, Japanese Patent Application Laid-Open No. 6-130462 discusses a light-metering apparatus using an accumulation-type light-sensitive element. When executing a light-metering operation, this apparatus alternately uses a prolonged charge accumulation time and a shortened charge accumulation time. In this way, even when the luminance difference in an object field is very large, the apparatus can obtain light-metering values from low to high luminance parts.

In addition, imaging apparatuses having an object tracking function are conventionally known. This function recognizes a main object within an imaging screen and automatically tracks the position of the main object. Use of this object tracking function continuously enables automatic focus adjustment control (AF control) or exposure control (AE control) on a moving main object.

Examples of an imaging apparatus having such object tracking function include an imaging apparatus having, other than an image sensor, a light-metering unit used for a light-metering operation, such as a single-lens reflex camera. Japanese Patent Application Laid-Open No. 7-110429 discusses an apparatus that tracks an object, based on light-metering data supplied from a light-metering unit.

In addition, Japanese Patent Application Laid-Open No. 2011-35765 discusses a tracking technique. Based on this technique, a feature region of a human, for example, is extracted from an image signal acquired from a light-measuring unit, and a correlated image is determined within subsequently acquired images. In this way, the extracted feature region can be focused and utilized for exposure control.

However, if it is attempted to increase the operable light-metering range based on the technique discussed in Japanese Patent Application Laid-Open No. 6-130462, with the technique of tracking an object based on light-metering data supplied from a light-metering unit as in the imaging apparatus discussed in Japanese Patent Application Laid-Open No. 7-110429, the following problems occur.

If a light-metering operation using a prolonged charge accumulation time and a light-metering operation using a shortened charge accumulation time are alternately executed to increase the operable light-metering range, each of the luminance ranges in which a light-metering operation is possible is different from each other. Thus, even if the luminance of a target tracking region is within the operable light-metering range in one light-metering operation, the luminance may be outside the operable light-metering range in another light-metering operation. If calculation is executed for correlation between such two light-metering data to track an object, accuracy of the correlation calculation is decreased. As a result, the object cannot be tracked or accuracy in tracking the object is decreased.

Similarly, if the imaging apparatus discussed in Japanese Patent Application Laid-Open No. 2011-35765 alternately executes a light-metering operation using a prolonged charge accumulation time and a light-metering operation using a shortened charge accumulation time, a feature region may or may not be extracted. Thus, a feature region cannot be stably extracted.

SUMMARY OF THE INVENTION

According to an aspect of the present invention, there is provided an imaging apparatus, comprising: a charge accumulation unit configured to accumulate charges based on an amount of incident light; a control unit configured to set a first control value for causing the charge accumulation unit to execute a first accumulation and obtaining first image data and a second control value for causing the charge accumulation unit to execute a second accumulation and obtaining second image data; a calculation unit configured to calculate an exposure control value based on at least one of the first and second image data; and a setting unit configured to set an operation mode. The control unit sets the first and second control values, depending on whether the operation mode set by the setting unit executes image recognition processing based on image data obtained through accumulation by the charge accumulation unit. If the operation mode set by the setting unit does not execute the image recognition processing, the control unit sets the first and second control values to be different from each other, even if an object field has a constant luminance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6E illustrate a method of determining a weighting coefficient per light-metering area of the digital still camera according to the exemplary embodiment of the present invention.

FIG. 7 is a weighting coefficient determination table used for determining weighting coefficients based on a feature region detection process and weighting coefficients based on an object tracking process of the digital still camera according to the exemplary embodiment of the present invention.

FIGS. 8A to 8F illustrate a method of setting a pixel addition range of the digital still camera according to the exemplary embodiment of the present invention.

DESCRIPTION OF THE EMBODIMENTS

Various exemplary embodiments, features, and aspects of the invention will be described in detail below with reference to the drawings.

Figure 1:
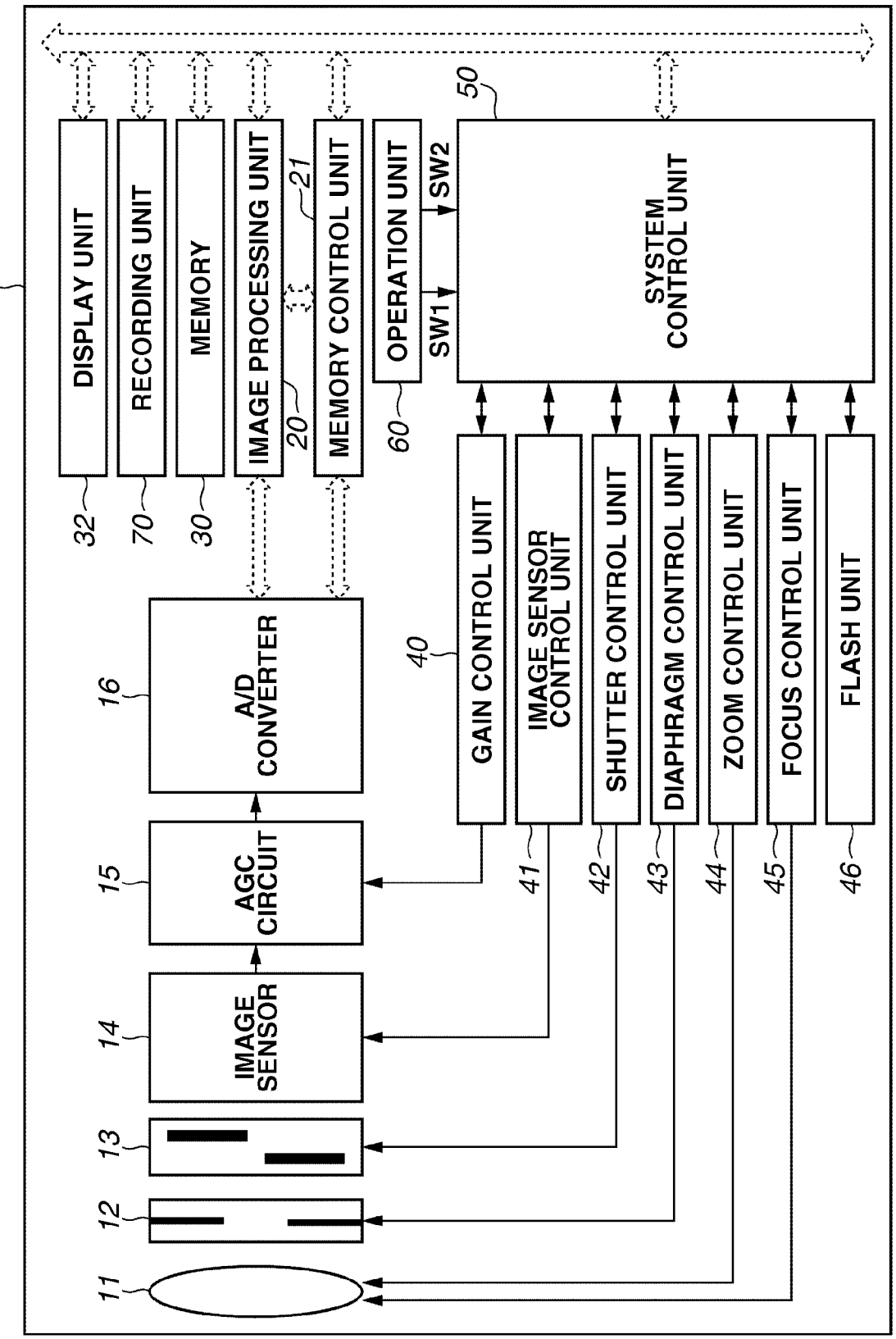
FIG. 1 is a block diagram illustrating a configuration of a digital still camera used as an example of an imaging apparatus according to an exemplary embodiment of the present invention.

FIG. 1 is a block diagram illustrating a configuration of a digital still camera (hereinafter, simply referred to as "camera") 10 used as an example of an imaging apparatus according to an exemplary embodiment of the present invention.

In the present exemplary embodiment, an imaging lens 11 has an automatic focus mechanism and a zoom mechanism. The imaging lens 11 can drive the zoom mechanism, based on a control signal supplied from a zoom control unit 44. In addition, the imaging lens 11 can drive a focus lens, based on a control signal supplied from a focus control unit 45.

Based on a control signal supplied from a diaphragm control unit 43, a diaphragm 12 controls the aperture size thereof and the amount of light incident on an accumulation-type image sensor 14. Based on a control signal supplied from a shutter control unit 42, a shutter 13 is opened and closed to control the exposure time of the image sensor 14.

The image sensor 14 is a complementary metal oxide semiconductor (CMOS) sensor, for example. Based on a control signal supplied from an image sensor control unit 41, the image sensor 14 executes photoelectric conversion per pixel and accumulates charges based on the amount of the incident light. In addition, the image sensor 14 converts an optical image into an electrical signal (image data) and outputs the electrical signal to an automatic gain control (AGC) circuit 15. Based on a control signal supplied from a gain control unit 40, the AGC circuit 15 executes gain adjustment on the image data supplied from the image sensor 14 and outputs the image data to an analog-to-digital (A/D) converter 16. The A/D converter 16 converts the gain-adjusted image data supplied from the AGC circuit 15, from analog data to digital data. The A/D converter 16 writes the converted digital image data in a memory 30 via both an image processing unit 20 and a memory control unit 21 or via only the memory control unit 21.

The image processing unit 20 executes a pixel correction process, a color conversion process, an automatic focus (AF) process, an automatic exposure (AE) process, a pre-flash (EF) process, an auto white balance (AWB) process, or the like on the image data supplied from the A/D converter 16 or the memory control unit 21.

Based on calculation results by the image processing unit 20, a system control unit 50 controls the gain control unit 40, the image sensor control unit 41, the shutter control unit 42, the diaphragm control unit 43, the zoom control unit 44, the focus control unit 45, and a flash unit 46.

The gain control unit 40 controls the gain of the AGC circuit 15. The image sensor control unit 41 controls the accumulation time and the pixel addition number of the image sensor 14. The pixel addition number will be described later. The shutter control unit 42 controls open and close operations of the shutter 13. The diaphragm control unit 43 controls the aperture size of the diaphragm 12. The zoom control unit 44 controls a zooming operation of the imaging lens 11. The focus control unit 45 drives the focus lens of the imaging lens 11 and controls the focal position.

The flash unit 46 has an AF auxiliary light projection function and a flash light amount control function.

The system control unit 50 includes, for example, a central processing unit (CPU), a read-only memory (ROM), and a random access memory (RAM), and controls an overall operation of the camera 10. In addition, the system control unit 50 executes an image recognition process, such as an object tracking process and a feature region detection process. As will be described later, the system control unit 50 executes an image recognition process, based on image data obtained through an accumulation operation by the image sensor 14.

In the object tracking process, a plurality of continuous image data is used, and a region similar to a target tracking region set by previous image data is detected from the following image data. More specifically, based on a luminance pattern distribution and a color pattern distribution of a target tracking region (a main object, for example) satisfying a predetermined condition within an imaging screen of previous image data, the system control unit 50 calculates the position of the target tracking region within the imaging screen of the following image data. In this way, the system control unit 50 tracks the target tracking region. Results of this object tracking process are used for AF and AE processes. Thus, AF and AE processes can be executed continuously on moving objects.

In the feature region detection process, image data is used to detect a feature region satisfying a predetermined condition, such as a human face region or a specific color region within an imaging screen. Results of this feature region detection process are also used for AF and AE processes. Suitable AF and AE processes can be executed on feature regions. In addition, results of the feature region detection process can be applied to the object tracking process. Namely, the object tracking process can be executed by setting a feature region detected by the feature region detection process as a target tracking region.

Alternatively, the system control unit 50 may be configured to control at least some of the gain control unit 40, the image sensor control unit 41, the shutter control unit 42, the diaphragm control unit 43, the zoom control unit 44, and the focus control unit 45. Alternatively, a CPU, which is different from that included in the system control unit 50, may be used to execute the object tracking process and the feature region detection process.

The memory 30 stores constants, variables, programs, and the like for operations of the system control unit 50.

A display unit 32 is a liquid crystal display (LCD) or the like and displays a menu screen and various information about the camera 10 in accordance with instructions from the system control unit 50. In addition, the camera 10 according to the present exemplary embodiment continuously executes imaging during an imaging standby state and displays captured images on the display unit 32. Namely, the camera 10 controls the display unit 32 to function as an electronic viewfinder.

An operation unit 60 includes a shutter button. If the shutter button is put into a half-press state, a shutter switch SW1 is turned on. If the shutter button is put into a full-press state, the shutter switch SW2 is turned on.

The system control unit 50 detects turning-on of the shutter switch SW1 as start instructions of the imaging preparation process. Accordingly, the system control unit 50 starts operations such as the AF and AE processes.

The system control unit 50 detects turning-on of the shutter switch SW2 as start instructions of an actual imaging process (imaging for recording). In the actual imaging process, the system control unit 50 exposes the image sensor 14, by controlling a diaphragm value and a shutter speed (exposure time) in accordance with the AE process.

In addition, the system control unit 50 writes image data obtained by the image sensor 14 in the memory 30 via the A/D converter 16 and the memory control unit 21. The system control unit 50 uses calculation results obtained by the image processing unit 20 and executes a development process (a color interpolation process, for example) on the image data in the memory 30. In addition, after the development process, the system control unit 50 reads the image data from the memory 30 and executes a recording process. For example, in this recording process, the system control unit 50 writes the image data in a recording medium of a recording unit 70 in image file format. If necessary, the system control unit 50 encodes the image data.

For example, the recording unit 70 includes a recording medium such as a semiconductor memory card and reads and writes data from and in the recording medium in accordance with instructions from the system control unit 50.

Next, an operation of the camera 10 will be described with reference to flow charts in FIGS. 2 to 5. The following description will be made, assuming that the power supply of the camera 10 is turned on, that is, that the camera 10 is in an imaging standby state. As described above, since the camera 10 continuously executes imaging in an imaging standby state, the display unit 32 functions as an electronic viewfinder then. Hereinafter, a captured image displayed by the display unit 32 functioning as an electronic viewfinder will be referred to as a through-the-lens image.

First, in step S101, the system control unit 50 determines whether the shutter switch SW1 is turned on or off. If the shutter switch SW1 is turned on (YES in step S101), the operation proceeds to step S102.

Next, in step S102, the system control unit 50 causes the image processing unit 20 to execute image processing for an AE process on image data of a through-the-lens image. Details of the AE process will be described later with reference to FIG. 3.

Next, in step S103, the system control unit 50 executes AF process of a known contrast method, by using the image data of the through-the-lens image. The system control unit 50 causes the image processing unit 20 to calculate an AF evaluation value from the image data of the through-the-lens image, causes the focus control unit 45 to drive the focus lens of the imaging lens 11, and searches for a focus lens position so that a maximum AF evaluation value is obtained. Next, the focus control unit 45 drives the focus lens to a position where a maximum AF evaluation value is obtained.

In step S104, the system control unit 50 determines whether the shutter switch SW2 is turned on or off. If the shutter switch SW2 is turned off (NO in step S104), the operation proceeds to step S105. In step S105, the system control unit 50 checks the shutter switch SW1. If the shutter switch SW1 remains turned on (YES in step S105), the operation returns to step S102. If not (NO in step S105), the operation returns to step S101.

In step S104, if the system control unit 50 determines that the shutter switch SW2 is turned on, the operation proceeds to step S106. In step S106, the system control unit 50 executes the above actual imaging, based on exposure control values calculated by the AE process in step S102.

Figure 2:
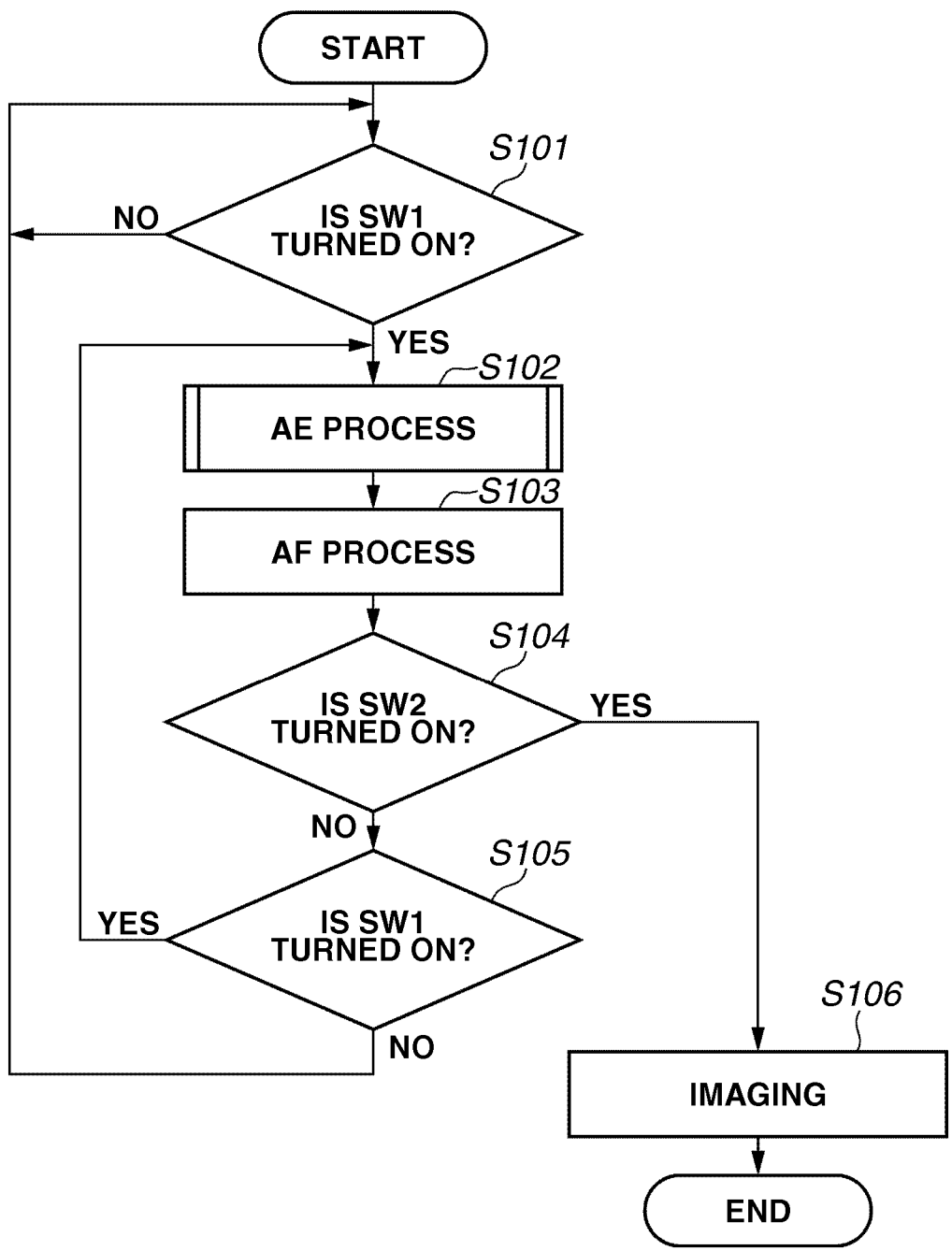
FIG. 2 is a flowchart illustrating an imaging process of the digital still camera according to the exemplary embodiment of the present invention.
Figure 3:
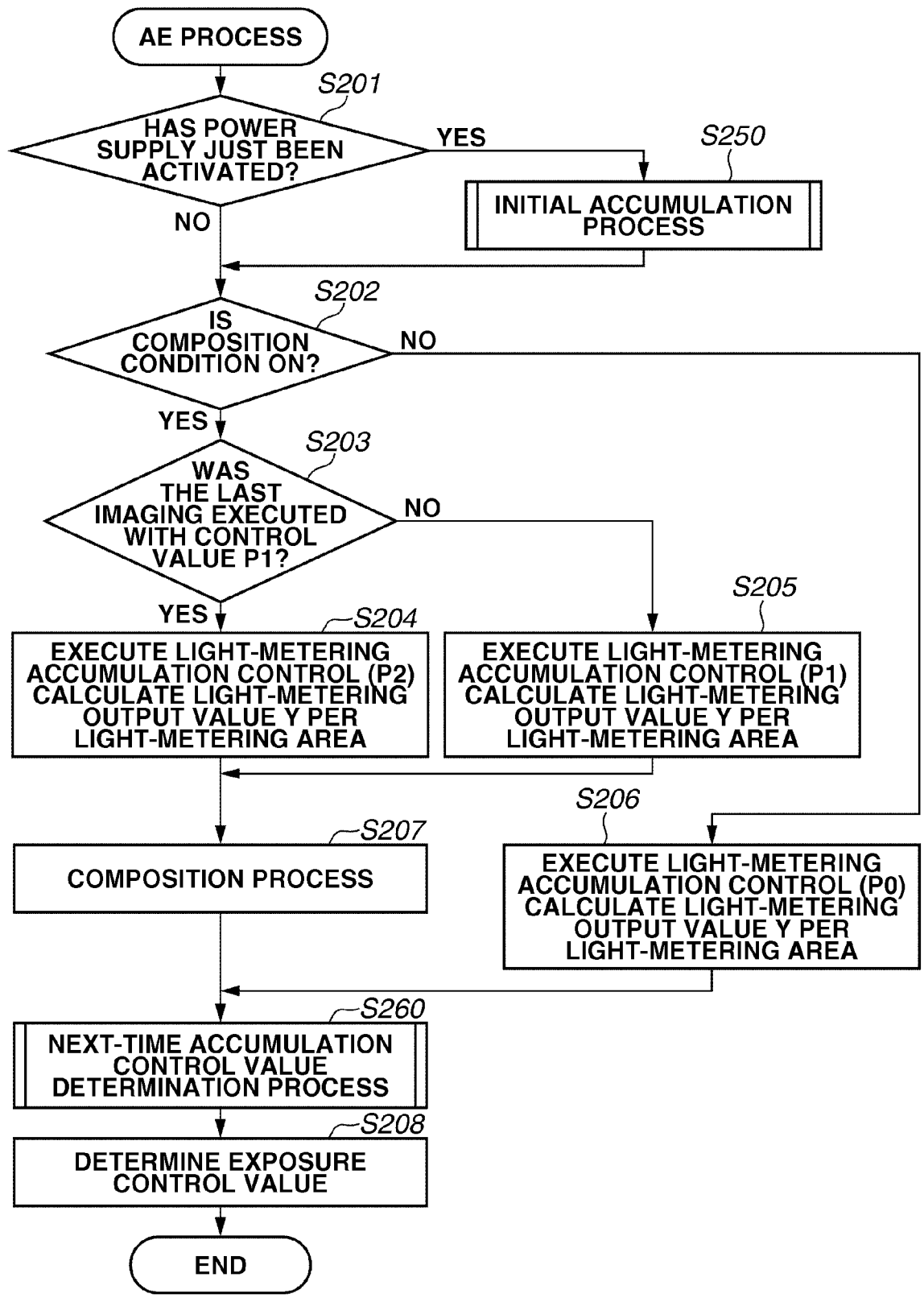
FIG. 3 is a flow chart illustrating an AE process of the digital still camera according to the exemplary embodiment of the present invention.
Figure 4:
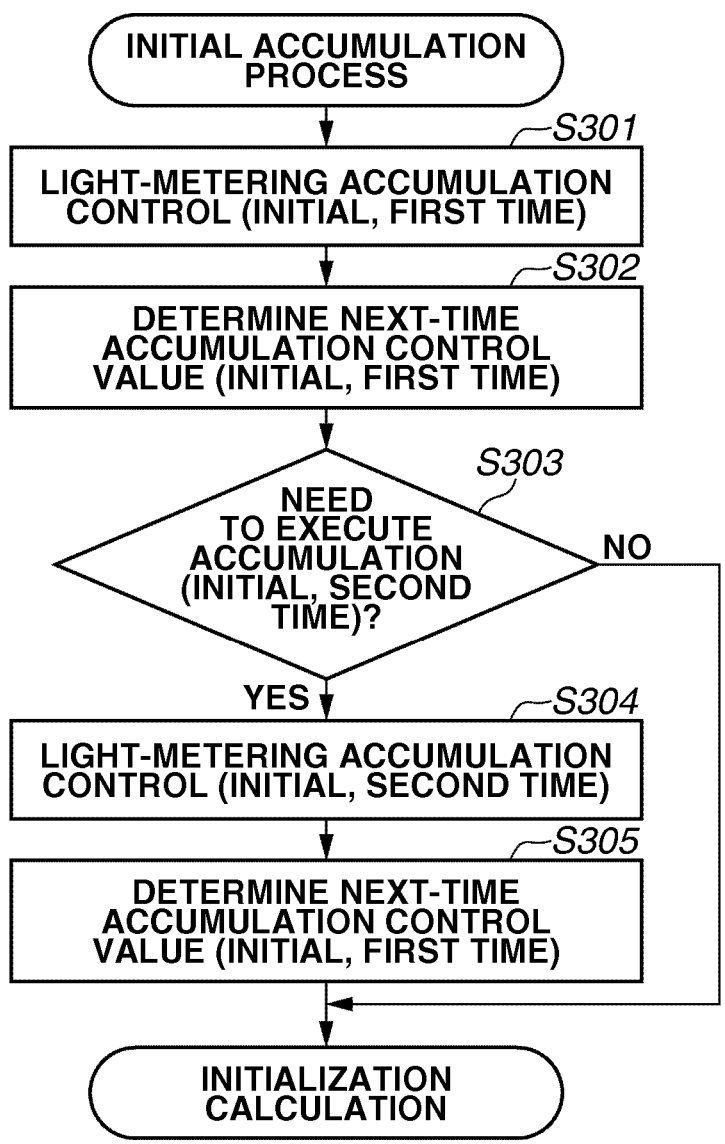
FIG. 4 is a flow chart illustrating an initial accumulation process of the digital still camera according to the exemplary embodiment of the present invention.
Figure 5:
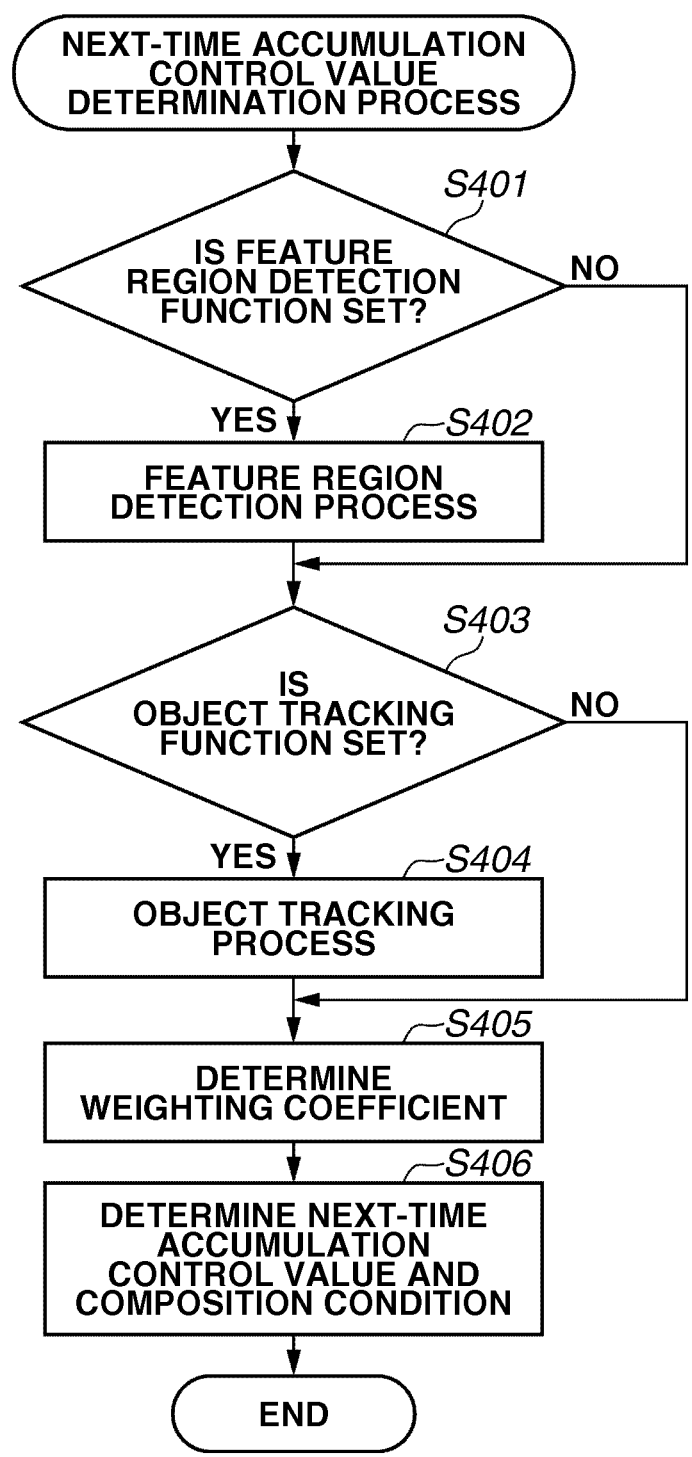
FIG. 5 is a flow chart illustrating a process for determining a next-time accumulation control value of the digital still camera according to the exemplary embodiment of the present invention.

FIG. 3 is a flow chart illustrating details of the AE process executed in step S102 in FIG. 2.

First, in step S201, the system control unit 50 determines whether the power supply has just been activated. If so (YES in step S201), the operation proceeds to step S250. If not (NO in step S201), the operation proceeds to step S202.

In step S250, the system control unit 50 executes an initial accumulation process. The initial accumulation process will be described with reference to a flow chart in FIG. 4 and FIG. 9.

In step S301, the system control unit 50 executes light-metering accumulation control (initial, first time). When executing the first accumulation (imaging) operation in the initial accumulation process, the system control unit 50 sets an accumulation time (Tv0) and a pixel addition number (Kv0) so that an output corresponding to the middle luminance in the light-metering range required by the camera 10 is a median in the dynamic range (from a minimum output value to a maximum output value) of the image sensor 14. For example, in the present exemplary embodiment, the required light-metering range is approximately −5 to +15 (Bv value). Thus, the system control unit 50 sets the accumulation time and the pixel addition number so that an output corresponding to luminance Bv5 is the median in the dynamic range of the image sensor 14. While the pixel addition number will be described later in detail, by changing the pixel addition number, image data obtained when the image sensor 14 executes accumulation is changed, as in the case of changing the exposure amount. Thus, hereinafter, change of the exposure amount encompasses change of the pixel addition number.

The present exemplary embodiment is described assuming that the diaphragm set in an accumulation process is always open. However, the diaphragm may be set in accordance with a predetermined program diagram.

The system control unit 50 executes the light-metering accumulation (imaging), based on the set accumulation time. When the set accumulation time elapses, the system control unit 50 causes the image processing unit 20 to calculate a light-metering output value Y relating to luminance, for each of the light-metering areas obtained by dividing an obtained captured image. While details of the light-metering areas will be described with reference to FIG. 8, in the present exemplary embodiment, an image is divided into a total of 24 light-metering areas in 4 rows and 6 columns. The number of light-metering areas is not necessarily limited to the above number. In addition, the captured image may be divided into light-metering areas having vertically or horizontally irregular shapes which are not arranged at equal distances.

In step S302, the system control unit 50 calculates a weighted average Yw, based on the light-metering output value Y per light-metering area calculated by the image processing unit 20 and a weighting coefficient k, as follows.

$$Yw = \Sigma Y_{ij} \times k_{ij} / \Sigma k_{ij}$$

In the above expression, letters i and j represent the position of a light-metering area. In the present exemplary embodiment, since the light-metering areas are arranged in 4 rows and 6 columns, position i ranges from 0 to 5 and position j from 0 to 3.

The weighting coefficient k used in the above is determined by the same way as in the process for determining a next-time accumulation control value in step S260. Thus, the weighting coefficient k will be described later.

In addition, the system control unit 50 determines whether to execute an initial accumulation process for the second time, based on a difference ΔY.

$$\Delta Y = \log 2 (Yw / Y\text{target})$$

In this expression, a target luminance value Ytarget is a target value of the weighted average Yw. The system control unit 50 sets exposure control values, so that the weighted average Yw approximates the target luminance value Ytarget.

If the difference ΔY is within a predetermined range (within ±3.0 levels, for example), the system control unit 50 uses the following expression to calculate a control value P0 for the next light-metering accumulation and does not execute the initial accumulation process for the second time, and the operation proceeds to step S202. The initial control value P0 for the first time is a value corresponding to the accumulation time (Tv0) and the pixel addition number (Kv0) set in step S301. The control value P will be described in detail later.
If (−3.0≤ΔY≤+3.0)
P0 (next time)=P0(initial, first time)+ΔY
P0 (next time) is a control value used in step S206, which is not the value used for the initial accumulation (imaging) for the second time.

If the difference ΔY is outside the predetermined range (outside ±3.0 levels, for example), the system control unit 50 calculates a initial control value P0 for the second time, changing an exposure amount by a predetermined amount (±6 levels, for example) and determines to execute the initial accumulation (imaging) for the second time.
Namely, if −3.0>ΔY,
P0 (initial, second time)=P0 (initial, first time)−6
If ΔY>3.0,
P0 (initial, second time)=P0 (initial, first time)+6
If the system control unit 50 executes an initial accumulation (imaging) operation for the second time (YES in step S303), the operation proceeds to step S304. If not (NO in step S303), the system control unit 50 ends the initial accumulation process and the operation proceeds to step S202.

Figure 9A:
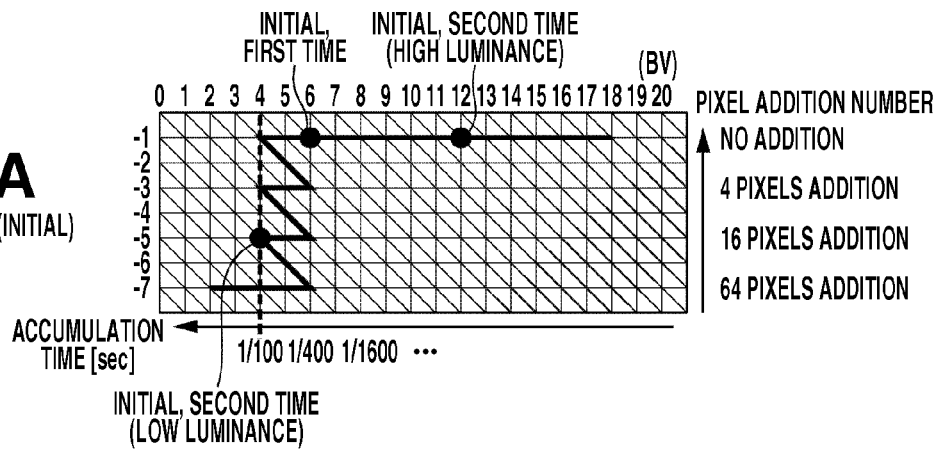
FIGS. 9A to 9E are program diagrams used for determining control values used for light-metering accumulation control operations of the digital still camera according to the exemplary embodiment of the present invention.

In step S304, the system control unit 50 determines the accumulation time (Tv0) and the pixel addition number (Kv0), based on the program diagram in FIG. 9A and the control value P0 (initial, second time) set for the initial light-metering accumulation control for the second time. As illustrated in FIG. 9A, when −3.0>ΔY, the accumulation time (Tv0) is 1/100 sec. and the pixel addition number (Kv0) is 16. When ΔY>3.0, the accumulation time (Tv0) is 1/25600 sec. and the pixel addition number (Kv0) is 0 (no pixel addition).

Next, in step S305, after acquiring image data and calculating the difference ΔY as in step S302, the system control unit 50 calculates a control value P0 for the next-time light-metering accumulation as follows.
If −3.0≤ΔY≤+3.0,
P0 (next time)=P0 (initial, second time)+ΔY If ΔY is outside ±3.0 levels, the exposure amount is changed by ±3.
Namely, if −3.0>ΔY,
P0 (next time)=P0 (initial, second time)−3
If ΔY>3.0,
P0 (next time)=P0 (initial, second time)+3
After setting a control value for the next-time light-metering accumulation, the system control unit 50 ends the initial accumulation process, and the operation proceeds to step S202 in FIG. 2.

In step S202, the system control unit 50 determines whether a composition condition set in step S406 described later is on. If the composition condition is on (YES in step S202), the operation proceeds to step S203. If not (NO in step S202), the operation proceeds to step S206. For the initial accumulation, before whether to execute a composition process is determined in step S406, the determination is made in step S202. Thus, after the initial accumulation, the system control unit 50 continues the process, assuming that the composition condition is off. Alternatively, the system control unit 50 may be configured to skip step S202 after the initial accumulation. In this case, the operation directly proceeds to step S206.

Next, in step S203, the system control unit 50 determines whether the last accumulation control operation was executed with a control value P1. If so (YES in step S203), the operation proceeds to step S204. If not (NO in step S203), the operation proceeds to step S205. As will be described later, control values P1 and P2 represent exposure amounts different from that of the control value P0. These control values P1 and P2 will be described later.

In step S204, based on the control value P2, the system control unit 50 determines an accumulation time (Tv2) and a pixel addition number (Kv2) and executes a light-metering accumulation process. After the accumulation, the system control unit 50 divides a captured image into a plurality of light-metering areas and calculates a light-metering output value Y per light-metering area.

In step S205, based on the control value P1, the system control unit 50 determines an accumulation time (Tv1) and a pixel addition number (Kv1) and executes a light-metering accumulation process. After the accumulation, the system control unit 50 divides a captured image into a plurality of light-metering areas and calculates a light-metering output value Y per light-metering area.

In step S206, based on the control value P0, the system control unit 50 determines an accumulation time (Tv0) and a pixel addition number (Kv0) and executes a light-metering accumulation process. After the accumulation, the system control unit 50 divides a captured image into a plurality of light-metering areas and calculates a light-metering output value Y per light-metering area. This control value P0 corresponds to the control value P0 (next time) calculated for the initial accumulation.

Next, in step S207, the system control unit 50 executes a composition process, after adjusting the previously calculated light-metering output value Y and the newly calculated light-metering output value Y in two different steps among steps S204 to S206. Namely, the system control unit 50 calculates a light-metering output value Y increasing light-metering range for each light-metering area. The composition process will be described later in detail with reference to FIG. 10.

Next, in step S260, the system control unit 50 executes a process for determining next-time accumulation control value.

The process for determining next-time accumulation control value will be described with reference to the flowchart in FIG. 5 and FIGS. 6A to 6E and 7. FIGS. 6A to 6E illustrate a method of determining a weighting coefficient for each light-metering area. FIG. 7 illustrates a weighting coefficient determination table used for determining weighting coefficients based on the feature region detection process and the object tracking process.

FIG. 6A illustrates image data obtained when a human is photographed. FIG. 6B illustrates an example in which each of the light-metering areas in the image data in FIG. 6A is associated with a light-metering output value Y calculated in step S206 or S207.

First, in step S401, the system control unit 50 determines whether an imaging mode using a feature region detection function is set. If an imaging mode using a feature region detection function is set (YES in step S401), the operation proceeds to step S402. If not (NO in step S401), the operation proceeds to step S403.

In step S402, the system control unit 50 executes the feature region detection process. In the example in FIG. 6C, the system control unit 50 detects a region of skin color (a region corresponding to a human face region) as a feature region, and the detected feature region is displayed in a detection frame 110. The feature region detection method and the detection target are not limited to the above examples. For example, the system control unit 50 may detect a pet animal face, a specified object, a specified color, or the like as a feature region.

In FIG. 6C, each light-metering area in the image data in FIG. 6A is associated with a weighting coefficient determined based on the feature region detection process. The weighting coefficients are based on the weighting coefficient determination table in FIG. 7. A light-metering area having a larger feature region is associated with a larger weighting coefficient.

Next, in step S403, the system control unit 50 determines whether an imaging mode using an object tracking function is set. If an imaging mode using an object tracking function is set (YES in step S403), the operation proceeds to step S404. If not (NO in step S403), the operation proceeds to step S405.

The feature region detection function and the object tracking function may be set depending on an imaging mode. Alternatively, these functions may be set as separate operation modes. Alternatively, the user may use the operation unit 60 to cause the system control unit 50 to set an imaging mode or an operation mode. Further alternatively, the system control unit 50 may examine a captured scene and automatically set an optimum imaging mode or operation mode.

Next, in step S404, the system control unit 50 executes the object tracking process. In the example in FIG. 6D, the system control unit 50 executes object tracking, by using the region of skin color detected in step S402 as a target tracking region. The target tracking region is displayed in a target track frame 120.

If an imaging mode that does not use such feature region detection function is selected, the user may use the operation unit 60 and specify a region. In this way, the system control unit 50 executes object tracking, by using the specified region as a target tracking region. Alternatively, if an imaging mode that does not use such feature region detection function is selected, the system control unit 50 may execute object tracking, by using a region determined based on results of the AF process as a target tracking region.

In FIG. 6D, each light-metering area in the image data in FIG. 6A is associated with a weighting coefficient determined based on the object tracking process. The weighting coefficients are based on the weighting coefficient determination table in FIG. 7. A light-metering area having a larger target tracking region is associated with a larger weighting coefficient.

In the present exemplary embodiment, the feature region detected in step S402 is also used as the target tracking region. Thus, in FIGS. 6C and 6D, the same light-metering areas are associated with larger weighting coefficients.

In the weighting coefficient determination table illustrated in FIG. 7, if the same percentage of a light-metering area is occupied, the same value is given as to the weighting coefficient based on the feature region detection process and as to the weighting coefficient based on the object tracking process. However, different values may be given. In addition, in the weighting coefficient determination table illustrated in FIG. 7, the image data is divided into 6 partitions of percentage levels with respect to light-metering areas. However, the present invention is not limited to such an example. The image data may be divided into an arbitrary partition number, namely it may be less than 6 or more than 6. In addition, a different partition number of percentage levels may be used as to the weighting coefficients based on the feature region detection process and as to the weighting coefficients based on the object tracking process.

Next, in step S405, the system control unit 50 determines the weighting coefficient k used for determining a control value for light-metering accumulation and for the composition process.

FIG. 6E illustrates the weighting coefficients k for the light-metering areas. In FIG. 6E, for each light-metering area, the initial value of the weighting coefficient k is set to be 5, and a weighting coefficient based on the feature region detection process and a weighting coefficient based on the object tracking process are added to the initial value 5.

If an imaging mode uses either one of the feature region detection function and the object tracking function, the weighting coefficient k for each light-metering area is an addition of the initial value to a weighting coefficient based on the feature region detection process or a weighting coefficient based on the object tracking process. If an imaging mode uses neither function, the weighting coefficient k for each light-metering area is set to be constant, in other words, the initial value 5.

The method of determining each weighting coefficient k is not limited to the above method. For example, a weighting coefficient may be represented by a relative ratio. In such case, a weighting coefficient based on the feature region detection process may be multiplied by a weighting coefficient based on the object tracking process, instead of being added together. In addition, the initial value of each weighting coefficient k is not limited to 5. For example, the initial value may be changed depending on the imaging mode, the light-metering mode, or the captured scene of the camera 10. In addition, if an imaging mode uses both the feature region detection function and the object tracking processing function, it is likely that the feature region and the target tracking region are the same region. In such a case, if the weighting coefficients based on the respective processes are added together, some of the light-metering areas may be associated with very large weighting coefficients k, compared with other light-metering areas. Therefore, if an imaging mode uses both the feature region detection function and the object tracking processing function, only the weighting coefficients based on either one of the processes may be used to determine the weighting coefficients k. Alternatively, a maximum value may be set for a weighting coefficient.

In step S406, the system control unit 50 calculates a weighted average Yw based on a light-metering output value Y and a weighting coefficient k per light-metering area and determines a next-time accumulation control value.

In addition, based on the weighted average Yw, the system control unit 50 determines a composition condition for judging whether to compound light-metering output values in the next AE process. A method of determining whether to execute a composition process will be described later in detail. Then, the system control unit 50 ends the process for determining next-time accumulation control value in step S260.

Next, in step S208, the system control unit 50 calculates a weighted average Yw' based on a light-metering output value Y per light-metering area calculated in step S206 or S207 and a weighting coefficient k' for exposure control values. Based on an object luminance value obtained from the weighted average Yw', the accumulation time, and the pixel addition number, the system control unit 50 calculates exposure control values (shutter speed, diaphragm value, sensitivity, etc.) during imaging. Since the method of determining the exposure control values is not directly related to the present invention and an arbitrary method can be used, detailed description of the method will be omitted.

The exposure control weighting coefficient k' is a coefficient for changing weighting of a light-metering output value for each light-metering area depending on the imaging mode, the light-metering mode, the captured scene, etc. of the camera 10. For example, if the light-metering mode is a center-focus light-metering mode, weighting coefficients for central light-metering areas of an image are set to be larger than those for peripheral light-metering areas of the image. If the camera has a feature region detection function, in an imaging mode using the feature region detection function, weighting coefficients for light-metering areas corresponding to feature regions are set to be larger than those for other light-metering areas. If the camera 10 has a function of automatically determining the type of the captured scene based on an object field condition, a weighting coefficient optimum for the determined scene is set for each light-metering area. Since the exposure control weighting coefficient k' is not directly related to the present invention, further description thereof will be omitted.

Next, a method of calculating pixel addition numbers and light-metering output values Y will be described with reference to FIGS. 8A to 8F.

The image sensor 14 of the camera 10 according to the present exemplary embodiment includes primary color filters, and each pixel has spectral characteristics corresponding to red (R), green (G), or blue (B). To facilitate description and comprehension, the following description will be made assuming that the image sensor 14 has pixels in 96 columns and 64 rows.

FIG. 8A schematically illustrates image data that has been read by the image sensor 14 controlled by the image sensor control unit 41 and has been written in the memory 30 via the A/D converter 16 and the memory control unit 21.

In the example in FIG. 8B, the image formed by the pixels in 96 columns and 64 rows is divided into 24 light-metering areas 200 in 6 columns and 4 rows. The image sensor has 16×16 pixels in a single light-metering area 200.

FIG. 8C is an enlarged view of a single light-metering area 200. FIG. 8C illustrates a pixel array when the image sensor 14 includes Bayer array color filters. However, the present invention is not limited to this color filter array. Another pixel array may be used, instead.

Figure 8E:
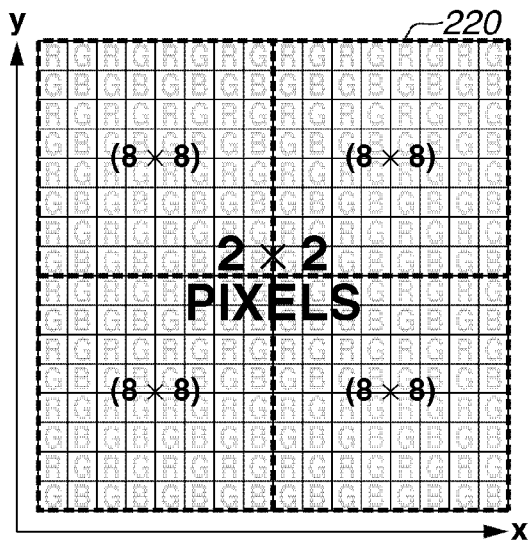
Figure 8F:
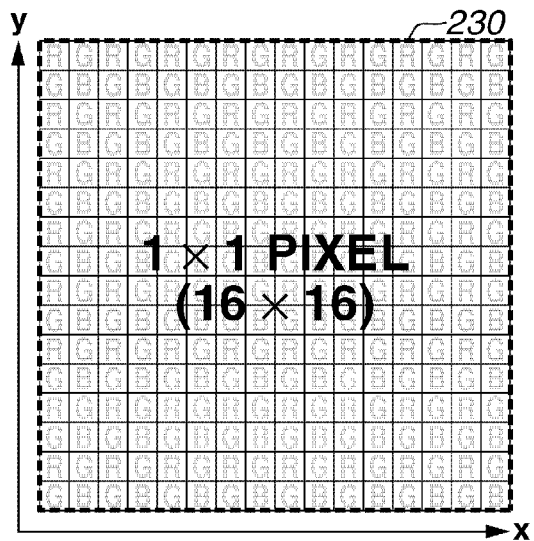

The image sensor control unit 41 sets an image sensor (or an image) range for adding outputs (pixel signals) of the same color pixels. For example, FIGS. 8D to 8F illustrate examples where a pixel addition range (4×4 pixels) 210, a pixel addition range (8×8 pixels) 220, and a pixel addition range (16×16 pixels) 230 are set in the light-metering area in FIG. 8C, respectively. Namely, the pixel addition number represents the number of pixels to which pixel signals are added.

Within the pixel addition ranges 210 to 230, pixel signals of each color in a unit array of 2×2 color filters (R, G1, B, and G2) are added 4 times, 16 times, and 64 times, respectively. In this way, one group of R, G1, B, and G2 addition values is obtained for each addition range.

Next, the accumulation time for obtaining the same output from the image sensor 14 in the case of an identical object field (identical scene) will be examined. Assuming that the accumulation time when no pixel signals are added together is 1, the accumulation time when the pixel addition ranges 210 to 230 are set is decreased to ¼ times, 1/16 times, and 1/64 times, respectively. Namely, by increasing the pixel addition number (by setting a wider pixel addition range), extension of the accumulation time in the case of low luminance can be prevented.

Next, a mean value is calculated for each of R, G (G1 and G2), and B within a light-metering area. For example, a light-metering output value Y is calculated, based on the following expression.

$$Y = 0.299 \times R + 0.587 \times G + 0.114 \times B$$

In this way, irrespective of the addition range, by calculating a single light-metering output value Y for each light-metering area, the composition process to be described later can be carried out. Alternatively, instead of calculating a single light-metering output value Y for each light-metering area, a single light-metering output value Y may be calculated for each addition range, and the light-metering output value Y may be used as an output value of the pixels within an addition range.

Next, a method of controlling the accumulation time and the pixel addition number will be described with reference to FIG. 9A.

FIG. 9A is a program diagram representing the accumulation time along the horizontal axis and the pixel addition number along the vertical axis, relative to the Bv values of an object field.

In FIG. 9A, a value (Tv+Kv) is obtained by adding an accumulation time (Tv) to a pixel addition number (Kv) and is defined as a control value P. The control value P is used to obtain image data through accumulation by the image sensor 14. This addition is executed based on APEX values, not based on an actual accumulation time (1/100 sec., for example) or an actual pixel addition number (16, for example). A specific accumulation time Tv (APEX) and a specific pixel addition number Kv (APEX) are determined in advance so that P (APEX)=Tv (APEX)+Kv (APEX) is satisfied. For example, "Annex C" in "Exchangeable Image File Format for Digital Still Cameras: Exif Version 2.1" discusses APEX units.

If the control value P is determined, the accumulation time Tv and the pixel addition number Kv are determined based on the program diagram in FIG. 9.

If the luminance is low, namely, if the Bv value is small, the accumulation time necessary to obtain an exposure amount is extended. If the necessary accumulation time exceeds a predetermined accumulation time (longer than 1/100 sec. in FIG. 9), the system control unit 50 increases the pixel addition number, to supplement the exposure amount that is insufficient if imaging is carried out with the predetermined accumulation time. Only when the insufficient exposure amount cannot be supplemented by increasing the pixel addition number to a maximum number (64 pixels in FIG. 9), the system control unit 50 sets the accumulation time to exceed the predetermined accumulation time (longer than 1/100 sec.).

If the luminance is high, namely, if an exposure amount can be obtained within the predetermined accumulation time, no pixel addition is executed. In the present exemplary embodiment, 1/100 sec. is set as the predetermined accumulation time. However, a different time period may be set as the predetermined accumulation time. In addition, a different accumulation time may be set, depending on the imaging mode of the camera 10, for example.

Next, a composition process of the light-metering output values Y will be described with reference to FIG. 9 and FIG. 10.

As described above, generally, a required light-metering range is approximately −5 to +15 (Bv value). Namely, the dynamic range consists of approximately 20 levels. However, the image sensor 14 according to the present exemplary embodiment has a dynamic range (a luminance range in which light-metering is possible in a single accumulation) showing less than 20 levels.

Therefore, in the present exemplary embodiment, by alternately and repeatedly executing accumulation control while changing the exposure amount, the light-metering range, in other words, the dynamic range of the image sensor 14, is expanded.

If at least one of the object tracking process and the feature region detection process is executed, to accurately execute the object tracking process or the feature region detection process, it is desirable that a target tracking region or a feature region be acquired within the dynamic range of the image sensor 14 during each light-metering accumulation. If a target tracking region or a feature region cannot be acquired within the dynamic range of the image sensor 14, the image of the target tracking region or the feature region is deteriorated due to overexposure or underexposure.

Thus, in the present exemplary embodiment, first, the system control unit 50 determines whether an imaging mode using at least one of the object tracking function and the feature region detection function is set. Next, according to a result of the determination, the system control unit 50 changes the control value change amount for obtaining image data through accumulation of the image sensor 14. Namely, depending on the imaging mode, the system control unit 50 changes the expansion width of the dynamic range of the image sensor 14.

The system control unit 50 sets a control value P0 as a reference for light-metering accumulation, so that an output corresponding to the weighted average Yw of light-metering output values is a median in the dynamic range of the image sensor 14 (i.e., a median of the output values of the image sensor is obtained when exposure is executed based on this control value).

If control values P1 and P2 are used, exposure amounts are shifted by predetermined values from that of the control value P0. For example, if the system control unit 50 determines that an imaging mode that uses neither the object tracking function nor the feature region detection function (hereinafter referred to as a D-range expansion priority mode) is set, the system control unit 50 sets the control values P1 and P2 shifting the exposure amount by +3 levels and −3 levels from that of the control value P0.

In contrast, if the system control unit 50 determines that an imaging mode that uses at least one of the object tracking function and the feature region detection function (hereinafter referred to as a function priority mode) is set, the system control unit 50 sets the control values P1 and P2 shifting the exposure amount by +2 levels and −2 levels from that of the control value P0. Namely, the difference in exposure amount between the control values P1 and P2 is smaller in the function priority mode than in the D-range expansion priority mode.

Figure 9B:
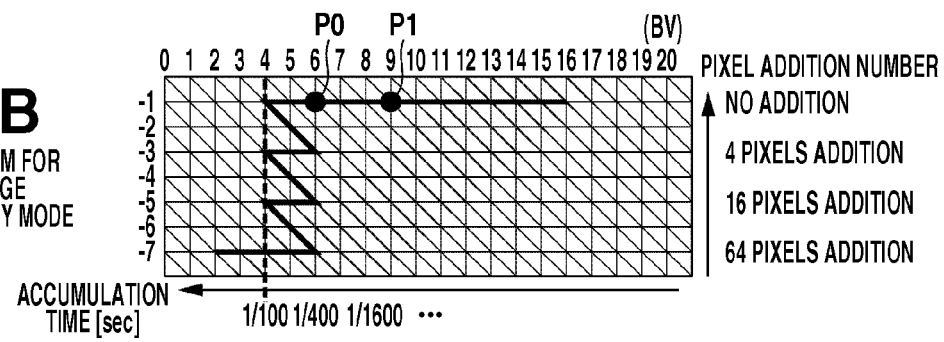
Figure 9C:
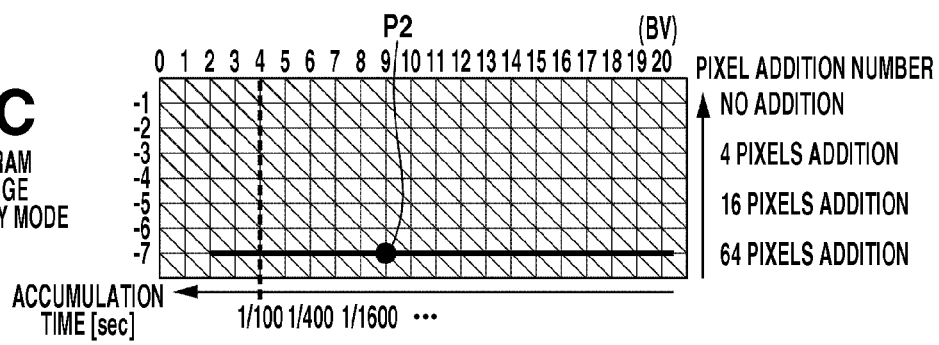

FIG. 9B is a program diagram for the control values P0 and P1 in the D-range expansion priority mode, and FIG. 9C is a program diagram for the control value P2 in the D-range expansion priority mode.

Points P0 to P2 in FIGS. 9B and 9C represent control values when the Bv value of an object field is 5. The control value P0 indicates an accumulation time of 1/400 sec. and no pixel addition is made. On the other hand, both of the control values P1 and P2 indicate the same accumulation time of 1/3200 sec., indicate no pixel addition number, and 64 pixels addition is made.

Figure 9D:
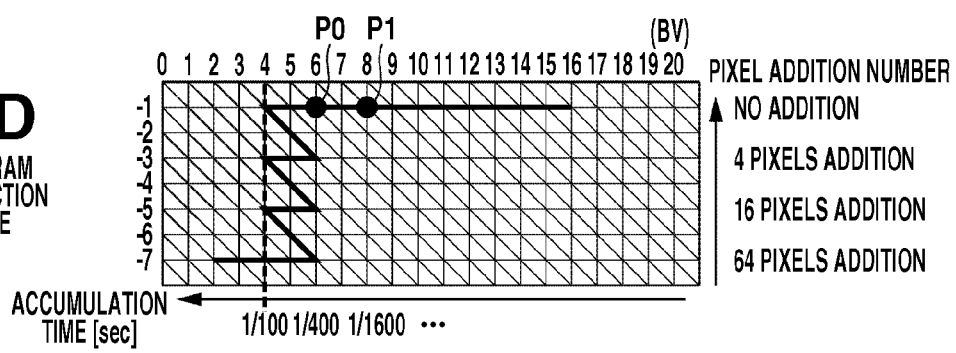
Figure 9E:
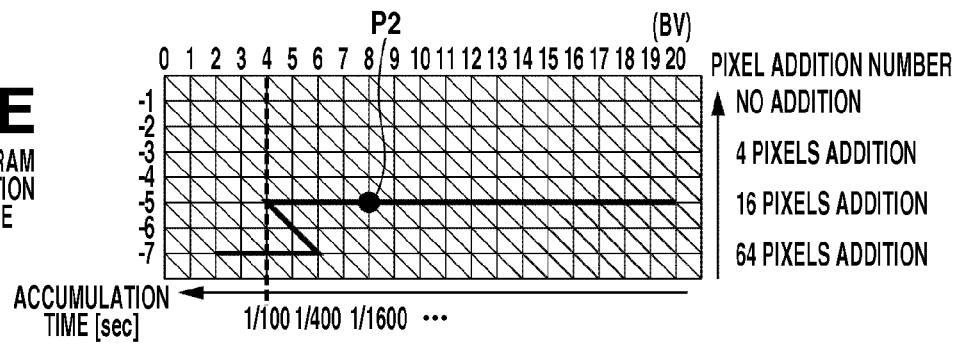

FIG. 9D is a program diagram for the control values P0 and P1 in the function priority mode, and FIG. 9E is a program diagram for the control value P2 in the function priority mode.

Points P0, P1, and P2 in FIGS. 9D and 9E represent control values when the Bv value of an object field is 5. The control value P0 indicates an accumulation time of 1/400 sec. and no pixel addition is made. On the other hand, both of the control values P1 and P2 indicate the same accumulation time of 1/1600 sec., indicate no pixel addition number, and 16 pixels addition is made.

Figure 10A:
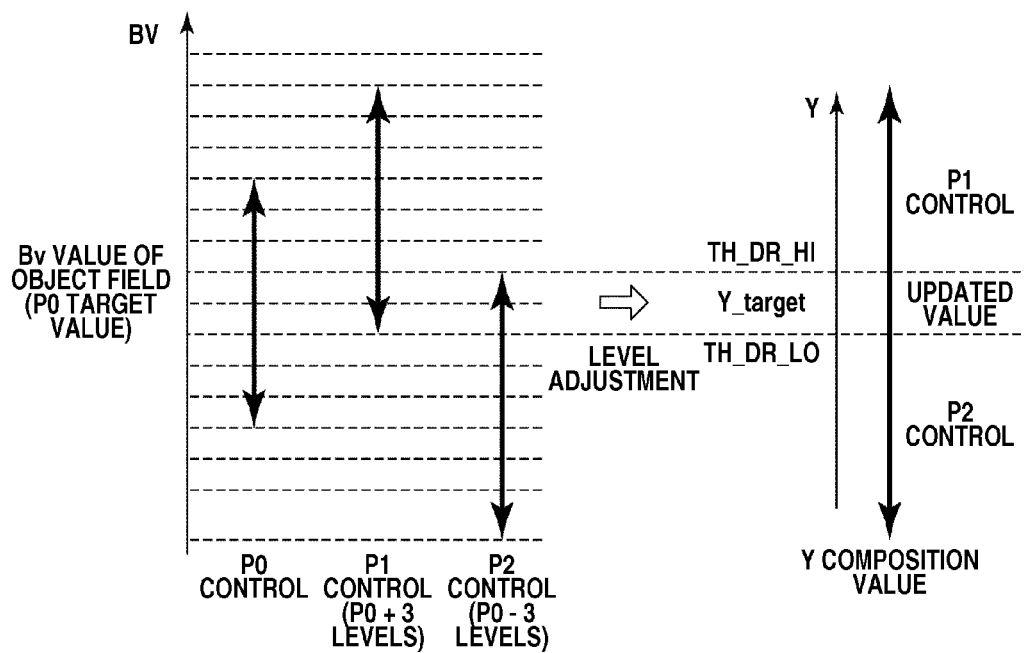
FIGS. 10A and 10B illustrate a process for compounding a light-metering output value in the AE process of the digital still camera according to the exemplary embodiment of the present invention.
Figure 10B:
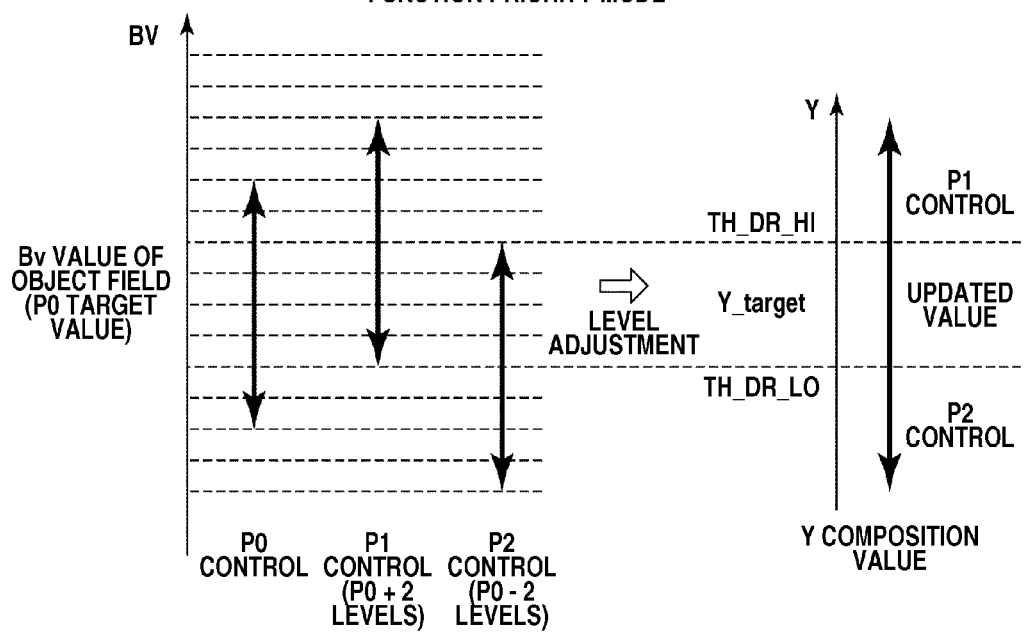

FIGS. 10A and 10B illustrate operable light-metering ranges (i.e., luminance ranges in which light-metering is possible) in which light-metering can be carried out by the image sensor 14 when imaging is executed based on the control values P0, P1, and P2. The light-metering ranges are illustrated with Bv values in an object field. Each of FIGS. 10A and 10B also illustrates a Y composition value that can be obtained by executing a composition process after adjusting the level of the light-metering output value Y for each light-metering area obtained based on the control values P1 and P2.

If the luminance of an object field changes between accumulation control (first accumulation) using the control value P1 and accumulation control (second accumulation) using the control value P2 and if the control value P0 changes, the change amount is reflected when the level adjustment is executed.

The level adjustment is executed based on thresholds TH_DR_HI and TH_DR_LO. The threshold TH_DR_HI corresponds to the upper limit of the Bv values in the operable light-metering range based on the control value P2, and the threshold TH_DR_LO corresponds to the lower limit of the Bv values in the operable light-metering range based on the control value P1.

The level adjustment is executed so that the same light-metering output value is obtained for the same Bv value. For example, a light-metering output value obtained when accumulation control is executed based on the control value P2 is corrected to match a light-metering output value obtained when accumulation control is executed based on the control value P1. More specifically, if no pixel addition is executed based on the control value P1 and 16 pixels addition is executed based on the control value P2, the light-metering output value obtained when accumulation control is executed based on the control value P2 is corrected to be 1/16. In this way, continuity between the light-metering output value and the Bv value in the light-metering range, after composition, can be maintained.

After the light-metering output value level adjustment, the system control unit 50 executes a composition process as follows. If the light-metering output value Y obtained from an image captured based on the control value P1 is greater than the threshold TH_DR_HI, this value is used as a value after composition. If the light-metering output value Y obtained from an image captured based on the control value P2 is smaller than the threshold TH_DR_LO, this value is used as a value after composition. If both of the light-metering output value Y obtained from an image captured based on the control value P1 and the light-metering output value Y obtained from an image captured based on the control value P2 are greater than the threshold TH_DR_LO and smaller than the threshold TH_DR_HI, a light-metering output value Y based on a newly captured image is used as a value after composition. This is because a light-metering output value Y based on a newly captured image reflects luminance of the current object field more accurately. According to the above method, there are cases where a final light-metering output value can be obtained only by one of the light-metering output value Y obtained from an image captured based on the control value P1 and the light-metering output value Y obtained from an image captured based on the control value P.

The above process can expand the possible light-metering range by approximately 6 levels (±3 levels) in the D-range expansion priority mode and by approximately 4 levels (±2 levels) in the function priority mode, compared with the operable light-metering range based on the control value P0.

In other words, the overlapping range between the operable light-metering range based on the control value P1 and the operable light-metering range based on the control value P2 can be set to approximately 2 levels in the D-range expansion priority mode and approximately 4 levels in the function priority mode.

As described above, when the control value P0 is used, an output corresponding to the weighted average Yw calculated by increasing the weighting coefficient k for a feature region or a target tracking region is set to be a median in the dynamic range of the image sensor 14. Namely, an output corresponding to a feature region or a target tracking region is set to be approximately the middle of the operable light-metering range based on the control value P0.

In the function priority mode, the lower limit of the operable light-metering range based on the control value P1 is different from the middle of the operable light-metering range based on the control value P0 by −2 levels. In contrast, the higher limit of the operable light-metering range based on the control value P2 is different from the middle of the operable light-metering range based on the control value P0 by +2 levels. Thus, a light-metering output value within ±2 levels from the middle of the operable light-metering range based on the control value P0 falls within the operable light-metering ranges based on the control values P1 and P2 control. Therefore, it is likely that both of the light-metering output values of a feature region and a target tracking region fall within the operable light-metering range.

Namely, the overlapping range between the operable light-metering range based on the control value P1 and the operable light-metering range based on the control value P2 in the function priority mode is set to be larger than that in the D-range expansion priority mode. As a result, it is possible to reduce the chance that a feature region or a target tracking region falls outside the operable light-metering range.

Thus, whether the camera 10 captures an image by using the control value P1 or P2, the camera 10 can execute the feature region detection process and the object tracking process accurately and suitably.

In each of the D-range expansion priority mode and the function priority mode, the difference in exposure amount between the control values P1 and P2 is not limited to the above number. For example, to further expand the dynamic range in the D-range expansion priority mode, the lower limit of the Bv values in the operable light-metering range based on the control value P1 may be set to be equal to the upper limit of the Bv values in the operable light-metering range based on the control value P2, so that no overlapping range is present.

Alternatively, other than the control values P1 and P2, a plurality of control values Pn may be set. By executing level adjustment for each light-metering area and executing a composition process, the operable light-metering range can be expanded. In this case, too, the exposure amounts of the continuous control values can be changed as described above. In the present exemplary embodiment, since the control values P1 and P2 are represented by APEX units, the difference between the control values P1 and P2 is changed to change the expansion width of the operable light-metering range. However, if the control values are not represented by APEX units, the ratio of the control value P1 to the control value P2 may be changed to change the expansion width of the operable light-metering range.

In addition, in FIG. 7, a composition process is executed on a light-metering output value Y for each light-metering area obtained based on the control values P1 and P2. However, the same applies to when a composition process is executed on a light-metering output value Y obtained based on the control value P1 or P2 and a light-metering output value Y obtained based on the control value P0.

Next, a method of determining whether to execute a composition process in step S406 will be described.

In step S406, based on light-metering results, the system control unit 50 determines whether to execute a composition process for the next-time light-metering accumulation. If the system control unit 50 determines to execute a composition process for the next-time light-metering accumulation, the system control unit 50 sets the composition condition to ON. If not, the system control unit 50 sets the composition condition to OFF.

The system control unit 50 calculates the weighted average Yw of the light-metering output value Y per light-metering area calculated in step S206 or S207, and the weighting coefficient k determined in step S405. Next, the system control unit 50 calculates the level difference ΔY corresponding to the difference between the target luminance value Ytarget and the weighted average Yw, as follows.

$$\Delta Y = \log 2(Yw/Ytarget)$$

If ΔY is within ±3.0 levels, since it is conceivable that no large luminance change is caused in the object field, the system control unit 50 sets the next-time imaging parameters as follows, to execute a composition process for the next-time light-metering accumulation.

If −3.0≤ΔY≤+3.0,
P0 (next time)=P0 (last time)+ΔY
P1 (next time)=P0 (next time)+3 (in the D-range expansion priority mode)
P2 (next time)=P0 (next time)−3 (in the D-range expansion priority mode)
P1 (next time)=P0 (next time)+2 (in the function priority mode)
P2 (next time)=P0 (next time)−2 (in the function priority mode)
Next-time composition condition: ON The control value P1 or P2 is determined depending on the set imaging mode. Namely, even if the luminance of the object field is constant (ΔY=0), the system control unit 50 uses different values for the last control value and the next control value.

On the other hand, if ΔY is not within ±3.0 levels, since it is conceivable that a large luminance change is caused in the object field, the system control unit 50 does not execute a composition process for the next-time light-metering accumulation. Namely, the system control unit 50 sets next-time imaging parameters for executing imaging based on the control value P0, as follows.

If $(-3.0 > \Delta Y)$,
P0 (next time)=P0 (last time)−3
Next-time composition condition: OFF
If $(\Delta Y > 3.0)$,
P0 (next time)=P0 (last time)+3
Next-time composition condition: OFF As described above, according to the present exemplary embodiment, the operable light-metering range can be expanded by executing light-metering based on a plurality of imaging operations using different exposure amounts, compared with that obtained by executing light-metering based on a single imaging operation. In addition, in an imaging mode using image data and detecting a region satisfying a predetermined condition, such as an object tracking process or a feature region detection process, by reducing the expansion width of the operable light-metering range, the operable light-metering range can be expanded and various types of processing can suitably be executed.

While the present invention has thus been described based on an exemplary embodiment, the present invention is not limited thereto. Various variations and modifications can be made within the gist of the present invention.

For example, the above exemplary embodiment has been described assuming that an image sensor that executes imaging of a recording image executes light-metering, the present invention is applicable to such a case where an accumulation-type image sensor, which is arranged separately from an image sensor that executes imaging of a recording image, executes light-metering.

In addition, in the above exemplary embodiment, the weighting coefficient k used for determining a light-metering accumulation control value and execution of a composition process and the exposure control value weighting coefficient k' are determined by different determination methods. However, the same weighting coefficient may be used.

In addition, the weighting coefficient k used for determining a light-metering accumulation control value and execution of a composition process may be set to be a predetermined value, depending on an imaging mode.

Further, the method of determining the weighting coefficient k in step S250 and the method of determining the weighting coefficient k in step S260 may be different.

Further, the luminance range in which light-metering is possible may be changed by changing the exposure time, instead of changing the pixel addition number between the control values P1 and P2. Alternatively, the luminance range in which light-metering is possible may be changed by changing the combination of the pixel addition number and the exposure time between the control values P1 and P2.

In addition, the control value P0 may be set based on the light-metering output value of a feature region or a target tracking region, instead of the weighted average Yw calculated by increasing the weighting coefficient k for a feature region or a target tracking region.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-129554 filed Jun. 9, 2011, which is hereby incorporated by reference herein in its entirety.

What is claimed is:

1. An imaging apparatus, comprising:
a charge accumulation unit configured to accumulate charges based on an amount of incident light;
a control unit configured to set a first control value for causing the charge accumulation unit to execute a first accumulation and obtaining first image data and a second control value for causing the charge accumulation unit to execute a second accumulation and obtaining second image data;
a calculation unit configured to calculate an exposure control value based on at least one of the first and second image data; and
a setting unit configured to set an operation mode,
wherein the control unit sets the first and second control values, depending on whether the operation mode set by the setting unit executes image recognition processing based on image data obtained through accumulation by the charge accumulation unit, and
wherein, if the operation mode set by the setting unit does not execute the image recognition processing, the control unit sets the first and second control values to be different from each other, even if an object field has a constant luminance.

2. The imaging apparatus according to claim 1,
wherein the control unit sets the first and second control values so that the difference between the first and second control values is smaller in a case where the operation mode set by the setting unit executes the image recognition processing and an object field has a constant luminance, than in a case where the operation mode set by the setting unit does not execute the image recognition processing and the object field has a constant luminance.

3. The imaging apparatus according to claim 1,
wherein the control unit sets the first and second control values so that the ratio between the first and second control values is smaller in a case where the operation mode set by the setting unit executes the image recognition processing and an object field has a constant luminance, than in a case where the operation mode set by the setting unit does not execute the image recognition processing and the object field has a constant luminance.

4. The imaging apparatus according to claim 1,
wherein, if the operation mode set by the setting unit executes the image recognition processing and if the object field has a constant luminance, the control unit sets the first and second control values so that an overlapping range exists between a luminance range in which light-metering is possible with the first image data and a luminance range in which light-metering is possible with the second image data.

5. The imaging apparatus according to claim 4,
wherein the control unit sets the first and second control values so that an overlapping range existing between a luminance range in which light-metering is possible with the first image data, and a luminance range in which light-metering is possible with the second image data is wider in a case where the operation mode set by the setting unit executes the image recognition processing and if the object field has a constant luminance, than in a case where the operation mode set by the setting unit does not execute the image recognition processing and the object field has a constant luminance.

6. The imaging apparatus according to claim 1, further comprising:
an imaging unit configured to execute imaging, wherein the calculation unit calculates an exposure control value used for imaging by the imaging unit, based on at least one of the first and second image data.

7. The imaging apparatus according to claim 1, wherein the control unit sets the first and second control values, based on whether the operation mode set by the setting unit executes a feature region detection process based on the first or second image data.

8. The imaging apparatus according to claim 1, wherein the control unit sets the first and second control values, based on whether the operation mode set by the setting unit executes a tracking process based on the first or second image data.

9. The imaging apparatus according to claim 1, wherein the first and second control values are values corresponding to exposure amounts of the charge accumulation unit.

10. The imaging apparatus according to claim 1, wherein the first and second control values are values corresponding to accumulation time of the charge accumulation unit.

11. The imaging apparatus according to claim 1, wherein the charge accumulation unit comprises a plurality of pixels and a pixel signal is obtained from each of the pixels, and wherein the first and second control values are values corresponding to pixel numbers to which pixel signals are added.

12. An exposure control method, comprising:

accumulating charges based on an amount of incident light;

setting a first control value for executing a first accumulation and obtaining first image data and a second control value for executing a second accumulation and obtaining second image data;

calculating an exposure control value based on at least one of the first and second image data; and setting an operation mode, wherein the first and second control values are set, depending on whether the set operation mode executes image recognition processing based on image data obtained through the charge accumulation, and wherein, if the set operation mode does not execute the image recognition processing, the first and second control values are set to be different from each other, even if an object field has a constant luminance.

* * * * *